July 20, 1943.  A. L. KRONQUEST  2,324,783
SURPLUS FILL DRAW-OFF MEANS
Filed May 13, 1942  4 Sheets-Sheet 1

Fig. 1.

Inventor
Alfred L. Kronquest
By Mason, Porter & Diller
Attorneys

Patented July 20, 1943

2,324,783

UNITED STATES PATENT OFFICE 2,324,783

SURPLUS FILL DRAWOFF MEANS

Alfred L. Kronquest, Syracuse, N. Y., assignor to Continental Can Company, Inc., New York, N. Y., a corporation of New York Application May 13, 1942, Serial No. 442,832

20 Claims. (Cl. 226—22)

The invention relates generally to apparatus for ascertaining that liquid filled containers intended for the market shall include a predetermined quantity of fill. While adapted for more general uses, the invention primarily seeks to provide a novel form of surplus fill draw-off means particularly adaptable to use in machines of the character shown and described in the co-pending application for U. S. Letters Patent Serial No. 423,697, filed by Alfred L. Kronquest on December 19, 1941, and in which is included means for rapidly and efficiently testing the level of the fill in liquid filled containers, means for drawing off and reclaiming fill surpluses, and means for automatically rejecting all slack filled containers.

In the particular form of machine hereinbefore referred to, filled containers are fed into the machine in properly spaced relation and are received on individual supporting pads forming part of a peripherally pocketed rotary turret structure. The turret structure is rotatable about a central column in which is mounted a suction tube for drawing off and reclaiming fill surpluses from containers tested on the turret. The turret structure includes a testing head overlying each container supporting pad and each testing head includes a surplus draw-off tube structure which forms the main subject matter of the present invention, and electrodes engageable with the liquid in containers which are filled up to or in excess of the predetermined fill level for the purpose of controlling devices which operate to assure that slack filled containers are separated from the properly filled containers as they are fed from the machine. Means also is provided for lifting each pad at the testing station so that the surplus fill draw-off tube and the electrodes are suspended at a predetermined level in the container being tested. During this testing, any surplus fill in the container will be drawn off and reclaimed, and if the electrodes fail to contact the liquid, thereby indicating a slack fill, control devices are actuated to effect a rejection of the slack filled container. The present invention relates particularly to certain new and useful improvements in the surplus fill draw-off means, and to means for controlling the same.

It has been discovered that when an ordinary tubular structure without valve control is immersed in a liquid and evacuated to cause a drawing of liquid upwardly into the tube, surface tension in the liquid tends to cause the top surface of the liquid to draw up as a cone for an interval after the level of the liquid in the container has been lowered to the level to which the lower extremity of the tube is immersed, and this cone will continue to draw upwardly until the surface tension is broken. Obviously the liquid level in containers in which surplus fill is thus drawn off will be erratically lower than is intended, and it is the purpose of the present invention to provide a surplus fill draw-off means which will avoid the objections noted.

In its more specific nature the invention resides in providing a machine of the character stated embodying surplus fill draw-off equipments each including a draw-off tube adapted to be suspended in a container for drawing off surplus fill therefrom and equipped at its lower or receiving end with a novel valve structure adapted to be lowered into the liquid fill below the intended level therein, means also being provided for automatically closing each valve when the surplus fill has been drawn off to provide an accurate fill.

Another object of the invention is to provide in a machine of the character stated individual electrically operated valve actuating equipments each including a solenoid, a valve position determining rod and connections between the solenoid and the rod for controlling the position of the rod and valve.

Another object of the invention is to provide in a machine of the character stated in which the same electrodes which form a part of the controls effective to pass properly filled containers and reject slack filled containers constitute contacts in the control circuit effective to operate the valves and assure the drawing off of just the proper amount of liquid to leave the desired fill remaining in the container.

Another object of the invention is to provide in a machine of the character stated novel means for preventing undesirable valve actuation due to vibration of the liquid under test.

Another object of the invention is to provide in a machine of the character stated, individual liquid level testing and surplus draw off units each including a valve controlled draw off tube which is immersed in the liquid fill in the containers, electrically controlled means for automatically opening the valve to permit the drawing off of surplus fill and for then closing the valve when the proper amount of liquid fill remains in the container under test and including a solenoid, an energizing circuit in which the fill contacting electrodes are connected, and a normally closed switch, and means for automatically opening the switch at each valve closing so that subsequent contact of the proper fill of liquid with the electrodes, as by vibration, cannot act to close the control circuit so as to energize the solenoid and effect an undesired reopening of the valve.

With the above and other objects in view that will hereinafter appear, the nature of the invention will be more fully understood by following the detailed description, the appended claims and the several views illustrated in the accompanying drawings.

In the example of embodiment of the invention herein illustrated, the improved surplus fill draw-off means is shown as incorporated in a fill checking and surplus reclaiming machine of the character disclosed in the copending application for U. S. Letters Patent, Serial No. 423,697, filed by Alfred L. Kronquest on December 19, 1941. It is to be understood, of course, that while the invention is particularly adaptable to use in machines of this type, it may be incorporated in other forms of fill checking and reclaiming machines, or in filling machines.

In the particular machine referred to and herein illustrated in partial detail, there is included a frame having a top or table portion A over which filled containers are fed into the machine by feed-in mechanism generally designated B, and transferred by a star-wheel or transfer turret C to the main turret D wherein the containers are tested to determine whether they are overfilled or underfilled and on which any contained liquid surpluses are drawn off. Slack filled containers are discharged from a rejection pass E, while properly filled containers pass on and are transferred by the star-wheel or transfer turret F onto the delivery-way or feed-off mechanism generally designated G. See Figure 1.

While it is to be understood also that the invention is adaptable for use in testing and drawing off fill surpluses from various forms of containers, the containers herein illustrated are of the gallon can type such as are employed in the packaging of syrup, beverages, or the like. These containers include a body portion 5 to the upper end of which is affixed a cone top 6 terminating in a restricted pouring throat 7. The testing of the liquid level in said containers and the drawing off of liquid surpluses therefrom is effected through the restricted throat 7.

Since the particular form of fill checking and surplus reclaiming machine herein illustrated is disclosed in detail in the Kronquest application hereinbefore referred to, the detail structure of this machine and its operation will be referred to only briefly herein. As each filled container 5 is transferred by the star-wheel C onto the turret structure D, it is received on a supporting pad 8 carried at the upper end of a plunger 9 which is vertically reciprocable in a bearing provided therefor in the turret and equipped at its lower end with a roller 10 engageable with a cam track 11 for determining the position of the pad 8. It will be observed by reference to Figure 1 that the turret is equipped with a plurality of pockets and testing equipments, and that there is a pad 8 disposed centrally beneath each testing equipment and centered under each pocket.

Figure 5:
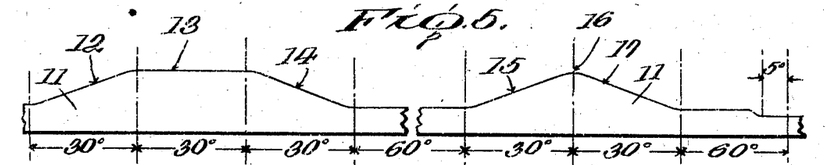
Figure 5 is a diagrammatic development of the pad position controlling cam.

It will be observed by reference to Figure 5 of the drawings that the cam track 11 includes a lift portion 12, a horizontal dwell portion 13 which is placed at the position at which the testing of each filled container and the drawing off of any surplus fill takes place and which merges into a pad lowering portion 14. Another pad lifting portion 15 is provided on the cam and leads to a crest 16 disposed at the same level of and at a point spaced circumferentially approximately 120° from the terminus of the dwell portion 13, which said crest merges into another pad lowering portion 17.

Each testing unit includes a clamp head 18 which is bored to receive the upper end of the draw-off tube 19. The tube is securely clamped as at 20 to the head and depends therefrom in position for being immersed in the liquid in the containers as the pads supporting them are lifted into the testing position. A pair of contact making and breaking, or tester electrodes 21 cooperate with each tube for the same general purpose as in the Kronquest patent application previously referred to, and several heads 18 are connected through individual radial ducts 22 with a common suction duct 23 extending centrally downwardly through the turret structure and being connected, in a manner not shown herein, with a suitable suction source and also with a reservoir into which reclaim surplus fill liquid can be deposited.

Each pad stem 9 has a latch recess 24 therein for receiving a spring-projected latch 25 carried by the turret. A pivoted latch actuator 26 is associated with each latch, and within the turret structure is mounted a latch tripping cam 27 carried on a lever 28 which is swingable in a vertical plane about a fixed pivot 29. The electrodes 21 are electrically connected, as at 30, with a source of electrical energy diagrammatically illustrated at 31 and with a solenoid 32 the core of which is link-connected, as at 33, with the lever 28. The lever-carried cam 27 is normally disposed in a position for being engaged by each latch actuator 26 at the fill checking station to hold the latch 25 away from the respective pad stem 9, but whenever a circuit is completed through the electrodes 19 by engagement thereof with liquid in a container being tested, the solenoid will be energized and the lever 28 lowered so as to displace the cam 27 and free the respective latch 25 so that it will enter the stem recess 24 and hold the pad elevated.

As each roller 10 rides up the lift portion 12 of the cam the container supported on the associated pad 8 will be lifted into the fill testing position illustrated in Figure 3 of the drawings so as to dispose the lower extremities of the electrodes 21 one at the normal fill level designated L and the other just below said level and the effective suction inlet into the draw-off tube structure below the normal fill level designated L. If the container includes a normal or surplus fill the engagement of the electrodes 21 with the liquid will complete a solenoid energizing circuit and free the respective latch 25 in the manner above described. All latches thus freed will retain the respective pads 8 in the elevated position while they are traveling from the dwell crest 13 of the cam at the fill checking station around to the cam crest 16. While passing in this elevated position between the cam crests 13 and 16, the pads pass over stripper cams 34 which would otherwise be effective to divert containers into the rejection pass E. See Figure 1. Containers thus determined to be properly filled are delivered into the normal feed-off means G. At the position of the cam crest 16 there is provided a cam roller 35 which engages the latch actuators and displaces the stem holding latches 25 so that the pads supporting properly filled containers will be lowered by the lowering surface 17 of the cam and delivered to said feed-off means G. It is to be understood, of course, that while the pads are traveling in elevated position, any surplus fill in the containers will be drawn off through the surplus fill draw-off means.

It is to be understood that the machine parts briefly described hereinabove, are the parts described more fully and in greater detail in the co-pending Kronquest application above referred to. The particular form of the surplus fill draw-off means and the electrical control equipments forming the main basis of the present invention will now be described.

Figure 1:
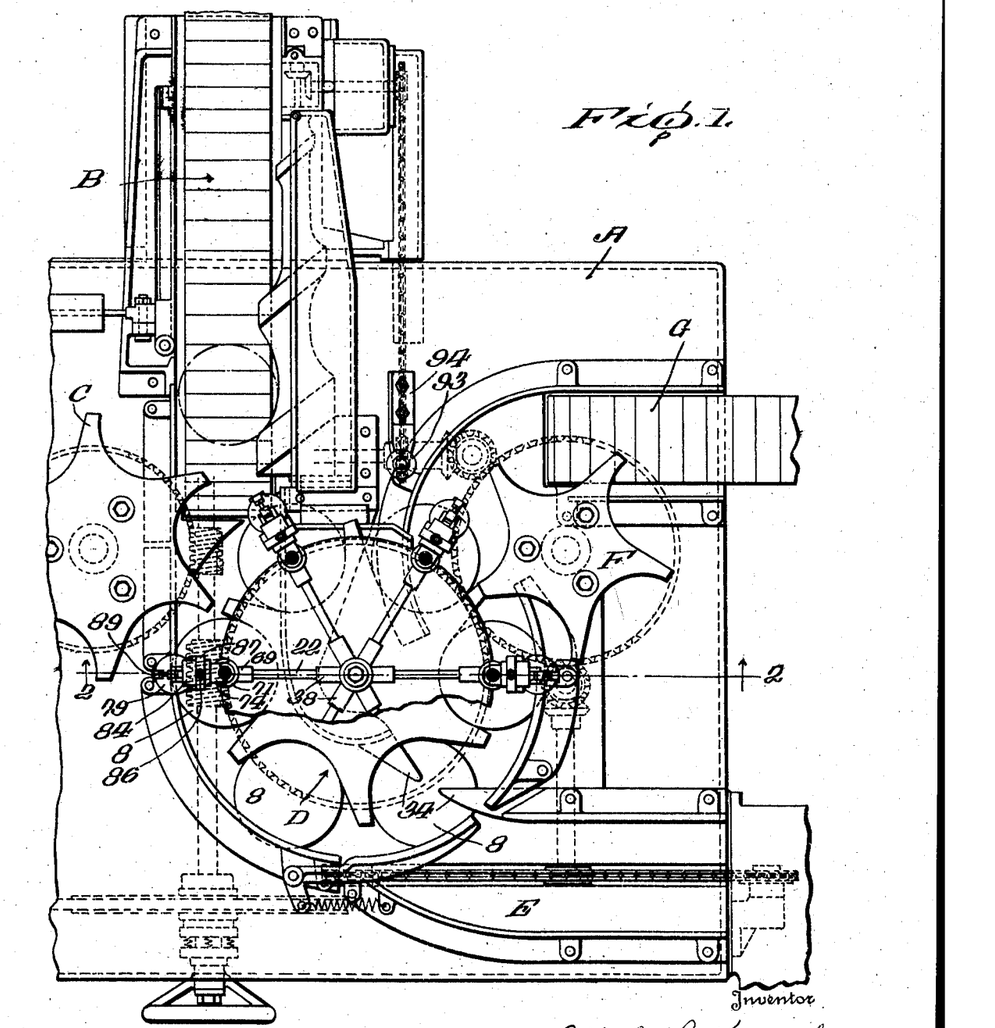
Figure 1 is a plan view of a fill checking and surplus reclaiming machine embodying the invention.
Figure 2:
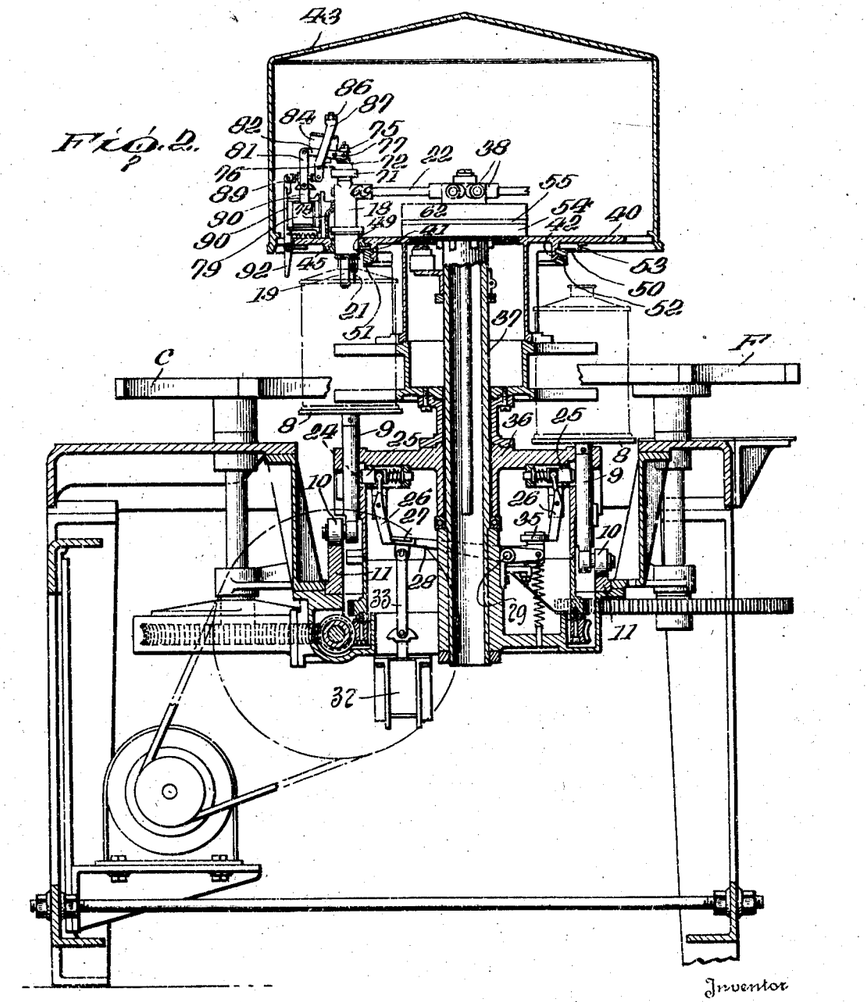
Figure 2 is a vertical cross section taken on the line 2—2 on Figure 1.
Figure 3:
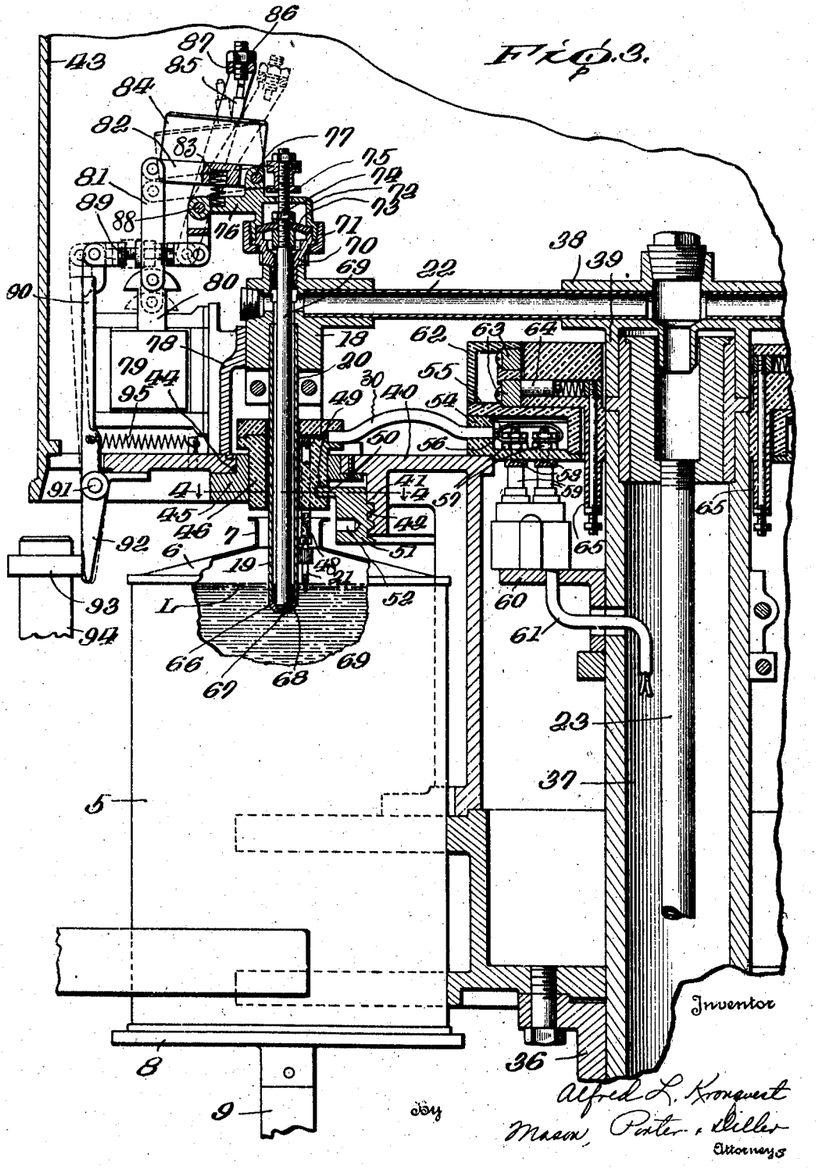
Figure 3 is an enlarged fragmentary sectional view illustrating a container being lifted into position for immersing the lower extremity of the draw-off tube therein, the parts being illustrated in full lines in the position assumed just before the valve is opened by electrical control, the open position of the valve being illustrated in dot and dash lines.
Figure 4:
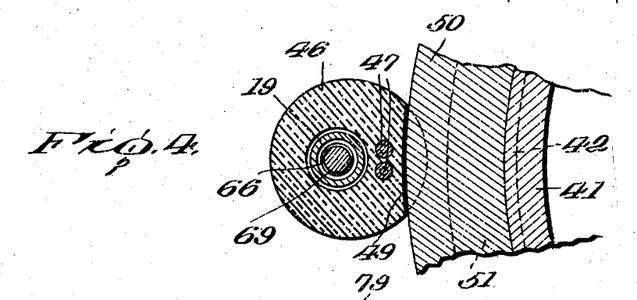
Figure 4 is a horizontal sectional view taken on the line 4—4 on Figure 3.

The turret structure D includes a body 36 which is rotatable about the stationary center column 37 through which the suction duct 23 depends in the manner hereinbefore described, and as clearly illustrated in Figures 2 and 3 of the drawings. The individual suction ducts 22 are secured to project radially from a mounting head 38 which has rotatable bearing as at 39 in the upper end of the column 37. The turret body carries a head plate or platform extension 40 on which the test control equipments are mounted in set units equidistantly spaced about the axis of the turret structure in the manner just illustrated in Figure 1.

The head plate 40 is equipped with a depending annular flange 41 which is externally threaded as at 42 for a purpose later to be described, and the head plate preferably serves as a support for a protective cover 43 dimensioned to fit over all of the control units and protect them from debris and inadvertent contact.

Outwardly of the depending flange 41, the head plate is provided with an aperture 44 at the position of each of the testing and control units. Each aperture is dimensioned to receive a plug supporting ring 45, and each ring is removably secured to the under surface of the head plate. See Fig. 3. Each ring 44 vertically slidably receives an insulating mounting plug 46 in which the contact rods 47 on which the electrodes 21 of that particular unit are vertically-adjustably secured as at 48. The rods 47 are electrically connected in the control circuits as at 30 as hereinbefore described. Each of the adjustably mounted plugs 46 is provided with an inwardly directed side slot 49 for receiving the flange 50 which projects peripherally from an adjuster ring 51 threadably mounted on the head plate flange 41. The adjuster ring is provided with wrench or tool receiving recesses 52 and may have its peripheral flange calibrated for cooperation with an indicator or pointer finger 53 depending from the under surface of the head plate. By turning the ring 51 while observing the pointer 53 and the calibration on the ring, the full complement of electrode supporting plugs 46 can be simultaneously lifted or lowered the desired amount to properly place the electrodes with relation to the liquid in the containers to be tested. As previously stated, the electrode elements can be individually adjusted on their supporting rods 47, and it is preferred that one electrode of each cooperating pair be adjusted so that it will be immersed slightly below the intended proper fill level in the containers whereas the other electrode element will be disposed at said level.

A pair of flanged rings 54 are cooperatively arranged in the manner illustrated in Figures 2 and 3 of the drawings for forming an insulator casing 55 having a contact chamber 56 therein into which the plurality of sets of contacts 57 project, a pair of such contacts being provided for electrical connection with each pair of the electrode supporting rods 47. The pairs of contacts 57 connect with the individual sectors of two concentric rings 58 which are secured by the contact members 57 to the under surface of the lowermost part of the rings 54. There being six tester units illustrated in the present machine, each of the rings 58 will be made up of six insulation rib separated sectors in the manner described and clearly illustrated in the original Kronquest patent application hereinbefore referred to. The sector rings 58 are engaged by brush contacts 59 which are stationarily supported on the center column 37 as at 60, and the contacts 59 are connected in the control circuit as at 61. See Figures 3 and 6.

Figure 6:
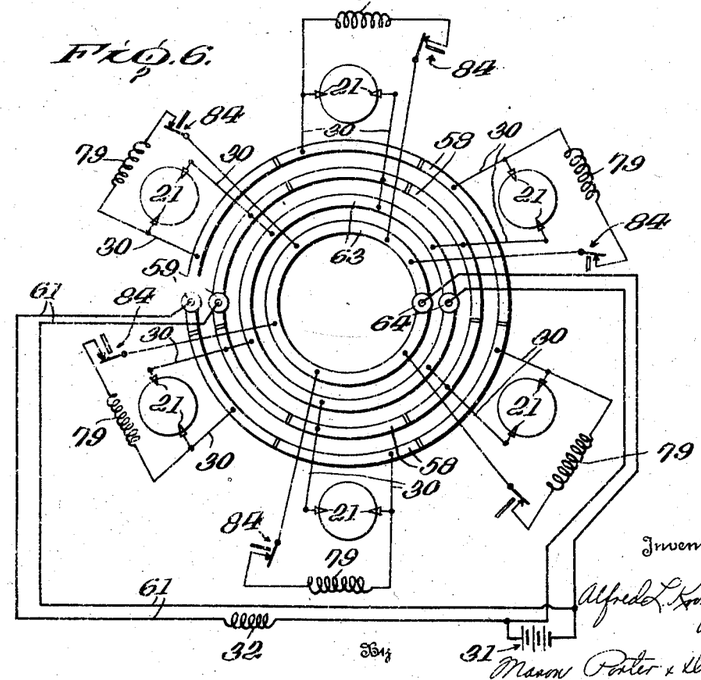
Figure 6 is a wiring diagram illustrating one manner in which the various control equipments can be connected in cooperative relation.

Another annular insulator casing 62 is mounted above and rotatable with the casing 55 and is equipped with two contact rings 63 engaged by individual brush contacts 64 which are stationarily supported on the column 37 and connect with connector rods 65 which are connected in the control circuit as are the rings 63 in the manner diagrammatically illustrated in Figure 6 of the drawings.

At its lower extremity each of the draw-off tubes 19 is equipped with a valve head insert 66 providing a tapered seat 67 for a needle valve 68 comprising the lower end extremity of a valve rod 69. Each valve rod extends upwardly in spaced relation through the respective draw-off tube and extends above the respective clamp head 18 into a casing comprising a lower half section 70 which is removably secured to the head 18 and which is coupled as at 71 to an upper casing half section 72, a rubber diaphragm 73 being clamped between the casing sections and secured as at 74 to the valve rod in a manner for providing a leak-proof and vacuum-proof seal in the casing structure.

The upper extremity of each valve rod has a grooved actuator head 75 vertically-adjustably mounted thereon. Each upper casing half section is equipped with an outwardly extended bracket arm 76 and an upwardly extended bracket arm 77.

A bracket 78 is secured to the head plate 40 at the position of each tester unit and serves as a rigid support for the respective clamp head 18 and also for a solenoid 79. The core 80 of each solenoid is link-connected as at 81 to the long arm of a valve actuator lever 82 which is pivoted intermediate its ends on the upwardly extended bracket arm 77, and the short end of the lever is engaged with the grooved actuator head on the respective valve rod so that as the lever 82 is swung upwardly or downwardly it will move the valve rod downwardly or upwardly. A compression spring interposed between the under surface of the lever 82 and the outwardly extended bracket arm 76 constantly tends to move the lever in the upward direction, or in other words, in the direction for effecting a downward movement or seating of the needle valve 68 in the manner illustrated in full lines in Figure 3. It will be obvious therefore that whenever the solenoid 79 is energized, its core will be pulled downwardly and the respective actuator lever 82 will be moved to cause the needle valve to be lifted or opened in the manner illustrated in dot and dash lines in Figure 3.

A micro switch 84 of the normally closed type is rigidly secured upon the upper surface of each actuator lever 82. The positioning of the individual switches is clearly illustrated in Figure 3 of the drawings and the relation of the switches and the solenoids 79 is illustrated diagrammatically in Figure 6 from which it will also be observed how these parts are connected in the control circuit along with the multiple sets of electrodes 21.

The switch control button 85 of each of the switches 84 extends upwardly in the manner illustrated in Figure 3 into position for normally underlying and being displaced for circuit breaking purposes by a breaker pin 86 which is adjustably secured at the upper end of a lever 87 which is pivoted as at 88 to the end of the respective outwardly extended bracket arm 76. The lever 87 depends below its pivotal mounting and is adjustable-link-connected as at 89 to the upper end of a breaker pin displacing lever 90. Each of the displacing levers 90 is pivoted as at 91 to the head plate 40 and includes a lower end portion or extension 92 which depends below the pivotal mounting of the lever in position for engaging a cam roller 93 which is stationarily supported as at 94. The position of this cam roller is best illustrated in Figure 1 of the drawings from which it will be apparent that each of the levers 90 will be engaged thereby and repositioned after the container last tested by the particular unit has been fed away from the turret structure and before the container next-to-be-tested by the particular unit has been deposited on one of the turret pads 8. A light retractile spring 95 anchored to the head plate 40 and connected to the respective lever 90 above its pivot constantly tends to return the lever to its normal position, illustrated in full lines in Figure 3.

The manner in which the machine parts operate to lift the containers into testing position and to latch securely such of the containers as include a proper or surplus fill in the elevated position so that they will pass over the stripper cams and be ultimately delivered over the discharge conveyor has been described in detail hereinbefore, and it has also been explained how latching of the supporting pads under slack filled containers is avoided so that these pads will be lowered into position for causing the stripper cams 34 to reject the slack filled containers and cause them to pass out over the rejection conveyor E. The operation of the structural features which are peculiar to the present case and constitute improvements over the previously disclosed structures will now be described. As each container is elevated into the testing position, the lower extremity of the respective draw-off tube 19 will be immersed in the liquid fill in the container, the needle valve 68 being closed at this time. As soon as the electrodes 21 contact the liquid film, assuming that a proper or surplus fill and not a slack fill is being tested, two things are accomplished by the completion of the circuit through the electrodes, namely, the latching of the pad in the elevated position in the manner previously described, and the opening of the valve so that the surplus fill can be drawn off therethrough.

Closing of the circuit across the electrodes 21 serves to energize the solenoid 79 and cause the respective actuator lever 82 to be drawn downwardly to effect the opening of the needle valve. With the valve thus opened, the drawing off of surplus liquid fill will progress until the falling level of the liquid in the container breaks the circuit across the electrodes 21 at which time the solenoid will be de-energized and the spring 83 will move the actuator lever upwardly and effect a closure of the needle valve. The upward movement of the lever and the switch 84 carried thereby causes the plunger 85 of the switch to engage and be displaced by the breaker pin 86, thereby breaking the control circuit through said switch. With the control circuit thus broken, it matters not if the agitation of the liquid fill in the just tested container should momentarily contact and cause a circuit across the electrodes 21. In other words, waves in the liquid film due to vibrations cannot complete the control circuit at this time in a manner for causing an unintended opening of the valve and a drawing off of additional liquid so as to provide an under fill. This safety switch arrangement also serves to prevent unnecessary energization and clicking of the solenoid.

It should be herein understood that each time one of the levers 90 is engaged by the cam roller 93, the respective breaker pin 86 will be displaced to the position illustrated in dotted lines in Figure 3, to thereby release the switch plunger 85 and restore the circuit through the respective switch 84 to its normal, closed condition. The light spring 95 will lightly urge the breaker pin 86 against the side of the switch button 85, and by reason of this contact, return of the breaker pin to its position over the plunger is rendered impossible until the solenoid 79 is energized in the manner hereinbefore described to effect a lowering of the respective actuating lever and the switch supported thereon as an incident to the opening of the needle valve, at which time the breaker pin will return to its normal position above the switch plunger so that when the switch is again elevated by the actuator lever under the urge of the compression spring 83, the breaker pin will function to break the control circuit through the respective switch 84 and prevent undesired opening of the valve in the manner hereinbefore described.

It is of course to be understood that the details of structure and the arrangement of parts may be variously changed and modified without distinguishing from the spirit and scope of the invention.

I claim:

1. In a machine of the character described, container supporting means, a tester unit including a suction tube and electrode means, means for bringing about relative movement between said support and the tube and electrode means to cause said electrode means to be deposited in a container at a predetermined normal fill level and the lower end of the tube below said level, valve means for permitting or preventing the drawing of liquid fill from the container through said tube, and means including a control circuit controlled by said electrodes for opening the valve means after the lower end of the tube is immersed in the fill in the container and for automatically closing said valve means as soon as enough liquid has been drawn off to bring the fill to said predetermined level.

2. In a machine of the character described, container supporting means, a tester unit including a suction tube, means for bringing about relative movement between said support and the tube to cause the lower end of the tube to extend a distance below a predetermined normal fill level in the container, valve means for permitting or preventing the drawing of liquid fill from the container through said tube, and means for opening the valve means after the lower end of the tube is immersed in the fill in the container and for automatically closing said valve means as soon as enough liquid has been drawn off to bring the fill to said predetermined level.

3. In a machine of the character described, container supporting means, a tester unit including a suction tube, means for bringing about relative movement between said support and the tube to cause the lower end of the tube to extend a distance below a predetermined normal fill level in the container, valve means for permitting or preventing the drawing of liquid fill from the container through said tube, and means for opening the valve means after the lower end of the tube is immersed in the fill in the container and for automatically closing said valve means as soon as enough liquid has been drawn off to bring the fill to said predetermined level, said valve means including a valve seat mounted at the bottom of the tube and a rod-like valve element engageable with the seat at its lower end and vertically reciprocable in the tube in spaced relation with the walls thereof.

4. In a machine of the character described, container supporting means, a tester unit including a suction tube and electrode means, means for bringing about relative movement between said support and the tube and electrode means to cause said electrode means to be deposited in a container at a predetermined normal fill level and the lower end of the tube below said level, valve means for permitting or preventing the drawing of liquid fill from the container through said tube, means including a control circuit controlled by said electrodes for opening the valve means after the lower end of the tube is immersed in the fill in the container and for automatically closing said valve means as soon as enough liquid has been drawn off to bring the fill to said predetermined level, and means under control of said electrode means for causing slack filled containers to be delivered at one point and properly filled containers to be delivered at another point.

5. A machine as defined in claim 1 in which there is included a rotor whereon a plurality of said tester units are mounted and means for moving the rotor about so as to present the units serially at a testing station, a vertically-adjustably mounted support for the electrode means of each unit, and means for vertically adjusting the positions of all electrode means supports in unison.

6. A machine as defined in claim 1 in which there is included a rotor whereon a plurality of said tester units are mounted and means for moving the rotor about so as to present the units serially at a testing station, a vertically-adjustably mounted support for the electrode means of each unit, and means for vertically adjusting the positions of all electrode means supports in unison, the electrode means of each unit comprising a pair of laterally spaced electrode elements, and means mounting the electrode elements on their respective supports for individual vertical adjustment.

7. A machine as defined in claim 1 in which there is included a rotor whereon a plurality of said tester units are mounted and means for moving the rotor about so as to present the units serially at a testing station, a vertically-adjustably mounted support for the electrode means of each unit, each said electrode means support having a recess therein directed toward the center of the rotor, and an adjuster ring threadably mounted on the rotor and engaged in all said recesses whereby adjustment of the ring will simultaneously effect vertical adjustment of all the electrode means.

8. In a machine of the character described, container supporting means, a tester unit including a suction tube, means for bringing about relative movement betwten said support and the tube to cause the lower end of the tube to extend a distance below a predetermined normal fill level in the container, valve means for permitting or preventing the drawing of liquid fill from the container through said tube, means for opening the valve means after the lower end of the tube is immersed in the fill in the container and for automatically closing said valve means as soon as enough liquid has been drawn off to bring the fill to said predetermined level, and means for preventing a second opening of the valve means following a first draw off opening thereof and before a container next to be tested is being moved into testing relation with the unit.

9. In a machine of the character described, container supporting means, a tester unit including a suction tube and electrode means, means for bringing about relative movement between said support and the tube and electrode means to cause said electrode means to be deposited in a container at a predetermined normal fill level and the lower end of the tube below said level, valve means for permitting or preventing the drawing of liquid fill from the container through said tube, means including a control circuit controlled by said electrodes for opening the valve means after the lower end of the tube is immersed in the fill in the container and for automatically closing said valve means as soon as enough liquid has been drawn off to bring the fill to said predetermined level, means for breaking the control circuit following each valve means opening and closing to prevent recurrent valve openings in any one container, and means for restoring the control circuit prior to each container testing operation.

10. In a machine of the character described, a rotary turret having thereon a plurality of filled container supporting pads and a plurality of overlying tester units all mounted in equidistantly spaced relation about the axis of the turret, each said unit including a support and suction tube and electrode means depending from each support, diverter cam means overlying the normal level of the pads and effective to engage containers on pads at said normal level and divert them from said pads to a place of rejected container deposit, a pad lifting and lowering cam portion effective to lift pads above said diverter cam means and having a crest portion disposed to cause the tube to be immersed in the container fill and said electrode means to depend in containers on the pads down to a predetermined normal liquid fill level in said containers thereby to cause said electrode means to contact the liquid and said suction tube means to draw off any surplus of fill, means electrically controlled by contact of said electrode means with liquid fill in containers to hold the pads and containers thereon in which such liquid contact is made at the elevated position whereby properly filled containers will be caused to move over said diverter cam means toward a delivery station, said lowering cam portion being effective to lower all underfilled containers in which electrode and liquid contact is not made into position for being engaged and diverted by said diverter cam means, a second lifting and lowering cam portion spaced circumferentially from said first mentioned cam portion and having a crest of the same height and located beyond said diverter cam means, means for releasing said holding means to permit the pads and properly filled containers thereon to be lowered on said second cam lowering portion and move on toward a delivery station, valve means for permitting or preventing the drawing of liquid fill from a container through each tube, and means including a control circuit controlled by the electrodes of each unit for opening the valve means after the lower end of the tube of a given unit is immersed in the liquid fill of a container and for closing the valve means as soon as enough liquid has been drawn off to bring the fill to said predetermined level.

11. In a machine of the character described, container supporting means, a tester unit including a suction tube, means for bringing about relative movement between said support and the tube to cause the lower end of the tube to extend a distance below a predetermined normal fill level in the container, valve means for permitting or preventing the drawing of liquid fill from the container through said tube, means for opening the valve means after the lower end of the tube is immersed in the fill in the container and for automatically closing said valve means as soon as enough liquid has been drawn off to bring the fill to said predetermined level, said valve means including a valve seat mounted at the bottom of the tube and a rod-like valve element engageable with the seat at its lower end and vertically reciprocable in the tube in spaced relation with the walls thereof, a tube support embracing the upper end of the tube, a draw-off duct communicating laterally with said tube, a gland casing mounted on the tube support and divided by a flexible air sealing diaphragm secured to the rod-like element, said rod-like element extending upwardly through said casing, and means for imparting movement to the rod-like element and connected thereto above said casing.

12. In a machine of the character described, a rotary turret having thereon a plurality of filled container supporting pads and a plurality of overlying tester units all mounted in equidistantly spaced relation about the axis of the turret, each said unit including a support and suction tube and electrode means depending from each support, diverter cam means overlying the normal level of the pads and effective to engage containers on pads at said normal level and divert them from said pads to a place of rejected container deposit, a pad lifting and lowering cam portion effective to lift pads above said diverter cam means and having a crest portion disposed to cause the tube to be immersed in the container fill and said electrode means to depend in containers on the pads down to a predetermined normal liquid fill level in said containers thereby to cause said electrode means to contact the liquid and said suction tube means to draw off any surplus of fill, each said pad having a stem depending therefrom and vertically-slidably supported on said turret and equipped with a latch receiving recess, a spring pressed latch engageable in each stem recess for holding the respective pad at its elevated position, latch releasing means normally effective to release latches and permit pads and underfilled containers thereon to be lowered by said lowering cam portion so that said containers will be engaged and diverted by said diverter cam means, means electrically controlled by contact of said electrode means with liquid fill in properly filled containers to render said releasing means ineffective whereby properly filled containers will be caused to move over said diverter cam means, and a second lifting and lowering cam portion spaced circumferentially from said first mentioned cam portion and having a crest of the same height and located beyond said diverter cam means, means for releasing latches holding properly filled containers in elevated position to permit them to be lowered by said second cam lowering portion and move on toward a delivery station, valve means in each said tube for permitting the drawing of liquid fill from a container therethrough, and means including a control circuit, the electrodes of each unit and individual solenoid operated valve means actuating devices for opening the valve means and then after an interval closing said valve means under the control of said electrodes while the pads are latch held in their elevated position.

13. In a machine of the character described, a rotor, container supports on the rotor, a plurality of tester units spaced about the rotor and each including a suction tube and a pair of laterally spaced electrode elements, means for bringing about relative movement between said supports and the units to cause the electrodes to be deposited in a container at a predetermined normal fill level and the lower end of the tube below said level, valve means in each tube for permitting or preventing the drawing of liquid fill from a container through the tube, means for moving the rotor about so as to present the units serially at a testing station, means including a control circuit and also an individual solenoid and actuating devices connecting the same with each valve means and effective under control of the respective electrodes for opening the respective valve means after the lower end of the respective tube is immersed in the fill in the container and for closing said valve means as soon as enough liquid has been drawn off to bring the fill to said predetermined level.

14. A machine as defined in claim 13 in which there is included means for breaking the control circuit through each solenoid following each valve means opening and closing to prevent recurrent valve openings in any one container, and means for restoring the control circuit prior to each container testing operation.

15. A machine as defined in claim 13 in which the control circuit includes a normally closed switch associated with each unit, and means for actuating the switch to open it as the respective valve is closed and for again closing it prior to placement of the unit in position to test another container.

16. A machine as defined in claim 13 in which the control circuit includes a normally closed switch movable with the valve actuating devices of each unit, and means engaged by each switch during its movement with said devices for effecting an opening of the switch as the respective valve is closed and a closing of the switch prior to placement of the unit in position to test another container, thereby to prevent recurrent openings of any valve means in any individual container.

17. A machine as defined in claim 13 in which the control circuit includes a normally closed switch movable with the valve actuating devices of each unit and having a plunger depressible for effecting an opening of the switch, a plunger depressor associated with each plunger, means for displacing the depressor out of its plunger depressing position prior to each container testing function to permit the switch to close, and means to return the depressor to its plunger displacing position so that the plunger will engage it when moving with the valve actuating devices in moving the valve to its closed position thereby to again open the switch and assure against recurrent openings of the particular valve in the just tested container.

18. A machine as defined in claim 13 in which the control circuit includes a normally closed switch movable with the valve actuating devices of each unit and having a plunger depressible for effecting an opening of the switch, a plunger depressor associated with each plunger, means for displacing the depressor out of its plunger depressing position prior to each container testing function to permit the switch to close, means to return the depressor to its plunger displacing position so that the plunger will engage it when moving with the valve actuating devices in moving the valve to its closed position thereby to again open the switch and assure against recurrent openings of the particular valve in the just tested container, each said depressor comprising an abutment element and a swingably mounted lever supporting the same, said displacing means comprising cam actuated lever and link connections with said lever, and said returning means comprising a spring.

19. A machine as defined in claim 13 in which the control circuit includes a normally closed switch movable with the valve actuating devices of each unit and having a plunger depressible for effecting an opening of the switch, a plunger depressor associated with each plunger, means for displacing the depressor out of its plunger depressing position prior to each container testing function to permit the switch to close, means to return the depressor to its plunger displacing position so that the plunger will engage it when moving with the valve actuating devices in moving the valve to its closed position thereby to again open the switch and assure against recurrent openings of the particular valve in the just tested container, each said depressor comprising an abutment element and a swingably mounted lever supporting the same, said displacing means comprising cam actuated lever and link connections with said lever, and said returning means comprising a spring initially effective to hold the abutment element ineffectively-laterally against the plunger so that when the plunger moves away with the valve actuating devices during the opening of the valve said abutment element will be freed to snap back to its effective position for being engaged by the plunger during the closing of the valve in a manner for again opening the switch.

20. A machine as defined in claim 13 in which the control circuit includes a normally closed switch movable with the valve actuating devices of each unit and having a plunger depressible for effecting an opening of the switch, a plunger depressor associated with each plunger, means for displacing the depressor out of its plunger depressing position prior to each container testing function to permit the switch to close, means to return the depressor to its plunger displacing position so that the plunger will engage it when moving with the valve actuating devices in moving the valve to its closed position thereby to again open the switch and assure against recurrent openings of the particular valve in the just tested container, each said depressor comprising an abutment element and a swingably mounted lever supporting the same, said displacing means comprising cam actuated lever and link connections with said lever, said returning means comprising a spring, each said abutment element being adjustably mounted on its supporting lever and each valve, tube and electrode set being adjustably mounted so that very accurate corelative placement of these parts can be effected.

ALFRED L. KRONQUEST.